(12) United States Patent
Clark

(10) Patent No.: US 6,466,655 B1
(45) Date of Patent: Oct. 15, 2002

(54) MOBILE TELE-COMPUTER NETWORK FOR MOTION PICTURE, TELEVISION AND TV ADVERTISING PRODUCTION

(75) Inventor: Curtis Clark, Beverly Hills, CA (US)

(73) Assignee: NeTune Communications, Inc., Culver City, CA (US)

( * ) Notice: Subject to any disclaimer, the term of this patent is extended or adjusted under 35 U.S.C. 154(b) by 0 days.

(21) Appl. No.: 09/356,542

(22) Filed: Jul. 19, 1999

Related U.S. Application Data

(63) Continuation of application No. 08/718,748, filed on Sep. 23, 1996, now Pat. No. 5,960,074.
(51) Int. Cl.[7] .......................... H04M 1/64; H04M 3/42; H04M 15/00
(52) U.S. Cl. ................ 379/88.13; 379/88.17; 379/101.01; 379/102.03; 379/201.01; 379/142.15; 379/142.16
(58) Field of Search ........................ 379/88.13, 88.17, 379/102.03, 201.01, 201.03, 220.01, 221.03, 221.08, 224, 240, 101.01, 142.15, 142.16; 348/8, 10, 12, 414, 417, 422, 390, 722, 723, 724; 386/52, 55; 389/185, 186, 189

(56) References Cited

U.S. PATENT DOCUMENTS

| 5,280,985 A | * | 1/1994 | Morris ..................... 296/26.15 |
| 5,568,205 A | * | 10/1996 | Hurwitz ....................... 348/723 |
| 5,745,185 A | * | 4/1998 | Portron et al. .............. 348/513 |

* cited by examiner

*Primary Examiner*—Allan Hoosain
(74) *Attorney, Agent, or Firm*—Brown Raysman Millstein Felder & Steiner, LLP

(57) ABSTRACT

A tele-computer network includes a redundant digital microwave communication system, at least one mobile vehicle, and a wireless local area network (LAN). In one embodiment, the microwave communication system transfers information using Ethernet packet switching. In another embodiment, the wireless LAN transfers information using the TCP/IP protocol. The mobile vehicle is configured to transfer information as a single nomadic transmission/reception point between the microwave communication system and the wireless LAN.

19 Claims, 1 Drawing Sheet

MOBILE TELE-COMPUTER NETWORK FOR MOTION PICTURE, TELEVISION AND TV ADVERTISING PRODUCTION

CROSS-REFERENCE TO RELATED APPLICATIONS

This is a continuation of U.S. patent application Ser. No. 08/718,748, filed Sep. 23, 1996, now U.S. Pat. No. 5,960,074.

FIELD OF THE INVENTION

The present invention relates to the field of communications systems; more particularly, the present invention relates to mobile communications designed for advantageous use with motion picture, television and TV advertising production.

BACKGROUND OF THE INVENTION

Most area of corporate enterprise are rapidly advancing their productivity via the use of computer networking. Computer networking is the connecting of multiple computers into a common communication system so that information may be exchanged between them. Computer network technology is redefining the way corporate America works. Computers and networking are being converged, spawning a synergistic fusion between the two that is reshaping current understanding of computer functionality. The advent of mobile computing employing high powered full-featured laptop and notebook computers as replacements for conventional desktop computer systems has enabled the "virtual office" to become the fastest growing area of business "real estate".

Intranets have recently begun to replace traditional client-server private networks as the chosen preference for network-centric (group) tele-computing. An Intranet is a private computer network using public Internet TCP/IP protocols and designed to be the most efficient and easy to use network for sharing information and data, including text, image and audio. Intranets are relatively cheap, they can exploit Internet features including the ability to establish Web sites to disseminate information, and they use available browsers (e.g., Netscape) to search for information.

The creative and commercial success of Motion Picture, Television and TV Advertising film production is dependent on the ability of the parties to communicate with their audiences. Likewise, the professionals engaged in the making of these films and TV shows would greatly enhance their efficiency and thereby reduce their production costs computer network technology into their work environment. Such technology may also improve prospects for more effective creative collaboration. However, there is currently no integrated and coherent mobile network computing technology that satisfies the needs of motion picture, television, and TV advertising production.

Although historically slow in embracing new electronic techniques, film and TV production personnel have recently been awakening to the incredible benefits that accrue from incorporating networked computing into their work and lifestyles. Fueled by the escalating need for ever greater efficiency to reduce production costs, what is needed is to incorporate telecomputing into film and TV production.

Furthermore, the realities of Motion Picture, Television, and Advertising film production demand a fail-safe reliability to any of the service areas that it depends on. Therefore, any solution that reduces production cost and increase efficiency cannot be implemented at the expense of reliability.

The present invention provides a telecomputer network that satisfies the needs of the Motion Picture, Television and TV Advertising industry. The network may be used to increase efficiency, reduce production costs and enhance creative collaboration, while maintaining reliability.

SUMMARY OF THE INVENTION

A telecomputer network is described. The network of the present invention includes a wireless wide area network (WAN) comprised of a redundant digital microwave communication system. The network also comprises at least one mobile communication hub and a wireless local area network (LAN). In one embodiment, the microwave communication system and the wireless LAN transfers information using an ethernet packet switching protocol, such as an Internet protocol (e.g., the TCP/IP protocol). The mobile hub may be in the form of a mobile vehicle (e.g. van) configured to transfer information as a single nomadic transmission/reception point between the microwave communication system (i.e., the wireless WAN) and the wireless LAN.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
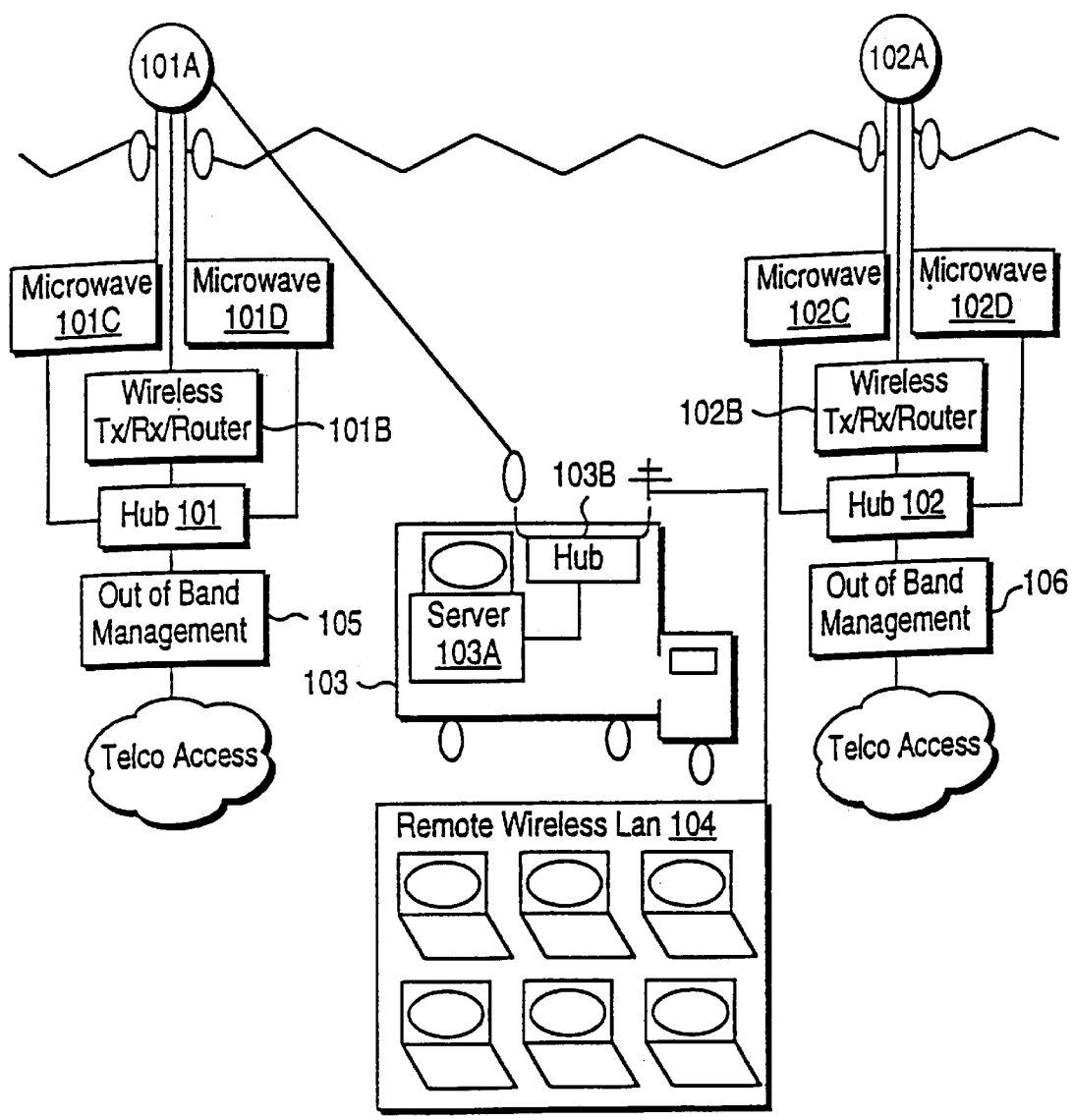
FIG. 1 is a block diagram of one embodiment of the system of the present invention.

A mobile network for use is described. In the following description, numerous details are set forth, such as bit rates, distances, etc. It will be apparent, however, to one skilled in the art, that the present invention may be practiced without these specific details. In other instances, well-known structures and devices are shown in block diagram form, rather than in detail, in order to avoid obscuring the present invention.

Overview of the Present Invention

A telecomputing network architecture is described. The network comprises a wireless local area network (LAN), at least one mobile hub, and a wireless wide area network (WAN) that includes a redundant digital microwave communication system. The mobile hub is in the form of a mobile vehicle (e.g., a van) and is configured to transfer information as a single nomadic transmission/reception point between the microwave communication system and the wireless LAN.

In one embodiment, the microwave communication system transfers information using multiple relay stations via an ethernet packet switching protocol such as the IEEE 802.10 protocol or the TCP/IP protocol used on the World Wide Web. By using the ethernet packet communication, multiple applications may access the microwave links at any one time. The wireless LAN also utilizes the ethernet protocol to transfer information.

In one embodiment, the wireless WAN of the present invention operates as a private Intranet using the TCP/IP protocols of the Internet. Its user operation may be based on the platform independent, Graphical User Interface (GUI) of the World Wide Web (e.g., Netscape Navigator). By using Web browser software (HTML, VRML, Java language, and numerous audiovisual "plug-ins" developed for Netscape), the present invention may create an effective, efficient, and easy to use Web based graphical multimedia environment for the dissemination of information and data on a private intranet, such as one used by media production industries.

Although the present invention is described with use of the TCP/IP Internet protocol, other protocols may be used. For instance, other protocols which may be employed by the present invention include asynchronous transfer mode (ATM), Internet Packet Exchange (IPX) (MINE) protocol, Lotus Notes, SMNP, NNP, Multiple Internet Mail Exchange IP (Internet protocol)—ATM, Web Network File System (WNFS), File Transfer Protocol (FTP), Fiber Distributed Data Interface (FDDI), Reliable Multi-cast Transfer Protocol (RMTP), and Multiprotocol OVER ATM (MPOA).

The wireless WAN is preferably a secure network. In such a case, software programs provide a secure "fire wall" to bar unauthorized entry from the public Internet. The present invention uses access codes and passwords to control access to data available through the network. In one embodiment, encryption is used on all data traffic between designated locations and our secured intranet servers and the high speed wireless digital network. Such security in the form of software is well-known in the art.

In one embodiment, the existing Internet backbone may be employed, where necessary, for relaying data between the servers of system users and intranet servers that provide the gateway to the wireless network of the present invention.

The integration wireless LAN ethernet technology with digital microwave relay stations provides broadband, high speed wireless connections between locations and fixed sites, which supports, for example, industries such as the Motion Picture, Television, and TV Advertising industries. The high bandwidth and fast data rate wireless mobility also enable a custom designed, fully integrated mobile computer network system.

The present invention provides a unique telecommunication system that is a comprehensive full-featured mobile Web-based intranet information management and communication system supported by a broadband microwave network infrastructure.

Exemplary Network System Embodiments

FIG. 1 illustrates the network system of the present invention. Referring to FIG. 1, the system 100 of the present invention comprises a private digital microwave network ring having multiple relay stations (hubs), such as exemplary hubs 101 and 102. Hub 101 includes a wireless transmit/receive router 101B with its associated antenna 101A and two transmit/receive relay components 101C and 101B. The system also includes one or more mobile hubs, such as mobile hub 103, and one or more wireless local area network (LAN) 104. Note that in one embodiment, there is a mobile hub station supporting every wireless LAN.

In one embodiment, each of the hubs are separated by 6 to 10 miles and operate at 40–60 MHz, which is much higher than fiber optics. In an alternative embodiment, the distance between hubs may vary to such distances as 25 miles. In one embodiment, each of the segments comprises a 20 Mbps bandwidth segment running in an 11 GHz frequency band. Three such channels of 20 Mbps each can be combined to provide 60 Mbps of available bandwidth. In another embodiment, a single channel 100 Mbps bandwidth segments (single antenna) are used. By using data rates of 60 to 100 Mbps, the microwave ring accommodates transmission of high resolution video images directly from a digital post production house to a shooting location.

The microwave ring employs system redundancy so that if one link is not functional, data may be routed in the opposite direction to arrive at its designated location. Using a spanning tree protocol, the system of the present invention determines the best route to send information on the fly to transfer information in the most efficient manner. This redundancy avoids the use of point to point parallel redundancy such as used by telcos to achieve the same affect. Thus, by using the microwave ring, the present invention provides telco independence.

In one embodiment, for locations outside the coverage area of the wireless WAN, transmissions are relayed via a satellite communications like to the WAN. Note that the present invention may utilize fiber optic cable connections to connect signals to the nearest digital microwave relay station. In one embodiment, relay stations of the digital microwave system are connected to a fiberoptic SONET ring which provides additional bandwidth of up to 1 Gbps. In one embodiment, each of hubs 101 and 102 also includes out of band management 105 and 106, respectively, which coordinates telco access when the microwave ring cannot support all of the transmissions because of limited bandwidth.

Wireless LANs at individual locations are liked to the wireless wide area network (wireless WAN) of the present invention and the Internet backbone via multipoint wireless routers, such as routers 101B and 102B. In one embodiment, these routers, each capable of 10 Mbps data transmission operating at 2.4 Ghz with an omni-directional radius of 8/9 miles and up to 25 miles with directional focus, will in turn be connected to a series of strategically placed digital microwave relay stations of the wireless WAN. In one embodiment, a 10–100 Mbts ethernet switch is located at each microwave site to serve as a bridge between the wireless downlink to the remote location and the microwave backbone.

In one embodiment, the LAN 104 is a wireless ethernet LAN connecting multiple remote personal computers (PCs) as nodes. In one embodiment, the LAN 104 covers an "on site" radius of up to ½mile at 2 Mbps from a mobile hub station, strategically placed at the designated location, such as mobile vehicle 103. For instance, the LAN 104 may be at the production's location LAN to service the location telecomputing communication needs of a film or TV production unit, even when shooting on a stage or studio lot.

In one embodiment the LAN is secure. The LAN may employ standard encryption or logging on security. In an alternate embodiment, the LAN includes video conferencing capabilities.

In one embodiment, the LAN 104 transfers data to megabits per second to a single point, which is the mobile hub station such as the mobile vehicle 103 described below. In one embodiment, the mobile hub station is housed in a custom fitted motor home (e.g., vehicle, van) that not only links the location LAN 104 to the Internet backbone via the microwave ring (i.e., the wireless WAN).

One or more hubs of the microwave ring are equipped with microwave antennas configured to communicate with one or more of the mobile hub stations. At each hub, down lining to sites is possible via wireless communication without the use of telco. In one embodiment, the speed of the up link and down link of information is at 10 megabits per second. For instance, microwave antenna 101A communicates with mobile vehicle 103.

When the mobile hub station has reached its location, its antenna is calibrated. In one embodiment, the calibration process is a line of sight process. In an alternate embodiment, the calibration process is not necessary where the mobile hub station includes an omni-directional antenna and is able to transfer information from a non-stationary position. In one embodiment, the mobile hub station only transfers data from a stationary position. However, even though the transfer of data only occurs from a stationary position, the mobile hub station is in fact a nomadic vehicle that may be driven any where and can still gain access to the wireless WAN of the present invention. Thus, the mobile vehicle receives high bandwidth at a mobile location, avoiding reliance on existing cable sites.

In one embodiment, the mobile hub station of the present invention includes a file server which accesses a proxy server. The server, such as server 103A, in each hub station is used to coordinate communication with a microwave antenna of a relay station, such as the microwave antenna 101A. The server updates the server back at a home office (not shown) and operates in synchronization with the home office. The file server also employs file sharing and routes mail. The home office would have access to these records.

In one embodiment, the mobile hub station also comprises a workstation viewing environment for broadband high resolution video location. The present invention provide a conduit infrastructure for internet information system management interactive relay of broadband video in real-time and at full workstation resolution. In one embodiment, the workstation includes a high resolution progressive scan monitor.

Note that the home office may coordinate all communication over the telecomputing network of the present invention. The home office includes a server to control communication with the entire system. In one embodiment, the home office comprises a single master location. However, as bandwidth requirements increase, additional master locations may be included in order to reduce overloading of segments on the microwave ring. These additional master locations may be interconnected by terrestrial-based highband width fiber optic links to the master location.

Software

The present invention uses Web-based software applications designed to facilitate information/data base organization and communication for the various areas of production specialization: directors; producers; cinematographers; editors; script supervisors; art directors; assistant directors; production managers; location managers; casting directors, etc.

In one embodiment, incorporated within its Web-based software applications, the service provides e-mail, downloading or uploading files from the FTP sites and Internet Relay Chat (IRC), as well as video conferencing. The system of the present invention may also offer the latest developments in "Web phone" voice communications and switch telephony from with the LAN to any phone using microcells in the LAN. This replaces conventional cellular phone connections and is seemlessly integrated with the Intranet's multi-media environment.

Acting as a "gateway" onto the full range of public Internet services, clients access any part of the Internet from their remote location nodes connected through one of a wireless LANs of the present invention, as well as from any conventional or cellular phone connection.

In one embodiment, the Intranet database management may be implemented using an inter/intranet standard such as IIOP (Internet Inter Operable-ORB) based on COBRA (Common Object Request Broker Architecture) and DCOM (Distributed Common Object Model) using active X framework.

As the digital processing of film images becomes increasingly germane to film production, creative collaboration by the Digital Artist in the filmmaking process will become as routine and valued as that of the Cinematographer or Production Designer. The ability to do real time wireless relay of High Resolution digital film images from a graphics workstation direct to a shooting location will, for the first time ever, offer new dynamic possibilities for the Digital Artist to participate as an active crew member in location filming. A skilled Digital Artist, working along side the Special FX Supervisor, may help shape the way Directors, Cinematographers, Production Designers and Producers are able to integrate their ideas with ever expanding possibilities of digital technology. Having remote mobile access during the shoot to digital image processing via the broadband wireless relay network of the present invention combine traditionally separated production from post-production.

In one embodiment, X Windows running on a PC is used at a shooting location to enable remote user manipulation of an SGI workstation. CGI work in progress, designed as composite components for live action images, can be relayed in real time to the shooting location, thereby making CGI truly interactive with filming process. Virtual Sets that will eventually be composited with the final film image can be integrated as reference components into camera compositions during live action shooting utilizing a high quality video assist.

Digital animated multimedia storyboards that are capable of incorporating 3D spatial renderings can become valuable interactive tools both for conceptual fine tuning and shot planning. Input from a variety of image sources, including photographic, graphic and CGI, both still and/or full motion, can be incorporated to generate a fertile environment facilitating the creative process. These animated multimedia storyboards will be able function as evolving organic "documents" during the entire production process helping to fine tune ideas and concepts between the director and his/her key collaborators.

Any information or data relevant to production administration, e.g., story boards, scripts or script changes, production schedules, budgets, maps and directions, location photos, call sheets, casting information, payroll information, accounting reports, bulletins, personnel directories, vendor catalogues, etc., incorporating text, audio, image, video can be uploaded to the production company's private intranet Web server resident at a central office(s) and accessed on demand by any authorized personnel regardless of their location. Even if a production member is outside the wireless LAN/WAN Service Area, access to the private intranet may be made via any conventional public Internet connection from anywhere in the world via a modem or ISDN terminal adapter.

In one embodiment, the present invention allows a camera generated time code to link to the Web and network application servers of the present invention. This allows for productions to cross-reference and access to all relevant data (e.g., script supervisor notes and camera data) to specific scenes and takes via his frame accurate time code.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the various embodiment are not intended to limit the scope of the claims.

I claim:

1. A telecomputer network system, comprising:

a redundant digital microwave communication system;

a wireless local area network (LAN); and a mobile hub station configured to transfer information as a single nomadic transmission/reception point between the microwave communication system and the wireless LAN using an ethernet packet switching protocol; and a computer, operatively connected to the mobile hub station through the LAN, for receiving and processing production administration information for transfer by the mobile hub station.

2. The telecomputer network system of claim 1, wherein the computer executes Web-based software applications to receive and process the administration information to facilitate information and database organization and communication for a plurality of production entities.

3. The telecomputer network system of claim 2, wherein the plurality of production entities are selected from the group including directors, producers, cinematographers, editors, script supervisors, art directors, assistant directors, production managers, location managers, and casting directors.

4. The telecomputer network system of claim 2, wherein the computer, using the Web-based software applications, provides a plurality of services selected from the group including E-mail, file downloading and uploading from File Transfer Protocol (FTP)-based sites and Internet Relay Chat (IRC), and video conferencing.

5. The telecomputer network system of claim 4, wherein the plurality of services include Web-phone-based voice communications and switch telephony within the LAN.

6. The telecomputer network system of claim 1, wherein the computer is a personal computer (PC) running the "X WINDOWS" operating system.

7. The telecomputer network system of claim 6, wherein the computer relays, in real-time, Common Gateway Interface (CGI)-based work-in-progress to a shooting location.

8. The telecomputer network system of claim 1, wherein the computer generates digital animated multimedia storyboards for displaying three-dimensional (3D) spatial renderings for conceptual fine tuning and shot planning during production.

9. The telecomputer network system of claim 8, wherein the computer receives input from a plurality of image sources, including sources selected from the group including photographic data, graphic data, Common Gateway Interface (CGI) data, still data, and full motion data.

10. The telecomputer network system of claim 1, wherein the computer processes production administration information, including information selected from the group including story boards, scripts, script changes, production schedules, budgets, maps, directions, location photos, call sheets, casting information, payroll information, accounting reports, bulletins, personnel directories, and vendor catalogues.

11. The telecomputer network system of claim 1, wherein the computer processes camera-generated time codes to link the production administration information to the Web and application servers associated with the mobile hub station.

12. A system comprising:

a communication subsystem;

a wireless local area network (LAN) that includes at least one computer; and a mobile hub configured to transfer broadband information as a single nomadic transmission/reception point between the communication subsystem and the wireless LAN using an ethernet packet switching protocol; and wherein the computer, operatively connected to the mobile hub station through the LAN, receives and processes production administration information for transfer by the mobile hub station.

13. The system of claim 12, wherein the computer executes Web-based software applications to receive and process the administration information to facilitate information and database organization and communication for a plurality of production entities.

14. The system of claim 13, wherein the plurality of production entities are selected from the group including directors, producers, cinematographers, editors, script supervisors, art directors, assistant directors, production managers, location managers, and casting directors.

15. The system of claim 13, wherein the computer, using the Web-based software applications, provides a plurality of services selected from the group including E-mail, file downloading and uploading from File Transfer Protocol (FTP)-based sites and Internet Relay Chat (IRC), and video conferencing.

16. The system of claim 12, wherein the computer relays, in real-time, Common Gateway Interface (CGI)-based work-in-progress to a shooting location.

17. The system of claim 12, wherein the computer generates digital animated multimedia storyboards for displaying three-dimensional (3D) spatial renderings for conceptual fine tuning and shot planning during production.

18. The system of claim 12, wherein the computer receives input from a plurality of image sources, including sources selected from the group including photographic data, graphic data, Common Gateway Interface (CGI) data, still data, and full motion data.

19. The system of claim 12, wherein the computer processes production administration information, including information selected from the group including story boards, scripts, script changes, production schedules, budgets, maps, directions, location photos, call sheets, casting information, payroll information, accounting reports, bulletins, personnel directories, and vendor catalogues.

* * * * *